(12) United States Patent
Sapra et al.

(10) Patent No.: US 12,185,205 B2
(45) Date of Patent: Dec. 31, 2024

(54) METHODS, SYSTEMS, AND COMPUTER READABLE MEDIA FOR REDUCING INTER-PUBLIC LAND MOBILE NETWORK (PLMN) FORWARDING OF MESSAGES RELATING TO Nnrf SERVICE OPERATIONS

(71) Applicant: Oracle International Corporation, Redwood Shores, CA (US)

(72) Inventors: Kawal Sapra, Bangalore (IN); Varun Saxena, Bangalore (IN); Amarnath Jayaramachar, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 363 days.

(21) Appl. No.: 17/549,555

(22) Filed: Dec. 13, 2021

(65) Prior Publication Data

US 2023/0188963 A1  Jun. 15, 2023

(51) Int. Cl.
*H04W 4/50* (2018.01)
*H04L 67/51* (2022.01)
(Continued)

(52) U.S. Cl.
CPC .............. *H04W 4/50* (2018.02); *H04L 67/51* (2022.05); *H04L 67/562* (2022.05); *H04W 8/08* (2013.01);
(Continued)

(58) Field of Classification Search
CPC ......... H04W 4/50; H04W 8/08; H04W 48/18; H04W 84/042; H04W 92/02; H04L 67/51; H04L 67/562
See application file for complete search history.

(56) References Cited

U.S. PATENT DOCUMENTS 7,848,767 B2  12/2010  McCann et al.
7,889,716 B2  2/2011  Tejani et al.
(Continued)

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

*Primary Examiner* — Steven S Kelley
(74) *Attorney, Agent, or Firm* — Jenkins, Taylor & Hunt, P.A.

(57) ABSTRACT

A method for reducing inter-PLMN forwarding of messages relating to Nnrf service operations includes receiving, at a first NRF, a first request for an Nnrf service operation, determining that the first request identifies a PLMN different from a PLMN of the first NRF, determining that the first request cannot be processed locally at the first NRF, and, in response, forwarding the first request to a second NRF in the PLMN identified in the first request. The method further includes receiving, from the second NRF, a response to the first request, caching information from the response, receiving a second request for an Nnrf service operation, determining that the second request identifies a PLMN different from the PLMN of the first NRF, determining that the second request can be processed locally at the first NRF, and processing the second request locally at the first NRF using the cached information from the first response.

16 Claims, 11 Drawing Sheets

(51) Int. Cl.
*H04L 67/562* (2022.01)
*H04W 8/08* (2009.01)
*H04W 48/18* (2009.01)
*H04W 84/04* (2009.01)
*H04W 92/02* (2009.01)

(52) U.S. Cl.
CPC .......... *H04W 48/18* (2013.01); *H04W 84/042* (2013.01); *H04W 92/02* (2013.01)

(56) References Cited

U.S. PATENT DOCUMENTS

| | | | |
|---|---|---|---|
| 7,916,857 | B2 | 3/2011 | Palmer et al. |
| 8,644,355 | B2 | 2/2014 | Agarwal et al. |
| 8,750,292 | B2 | 6/2014 | Agarwal et al. |
| 8,855,654 | B2 | 10/2014 | Agarwal |
| 9,021,014 | B2 | 4/2015 | Agarwal et al. |
| 9,100,796 | B2 | 8/2015 | Marsico |
| 11,283,883 | B1 * | 3/2022 | Krishan ................. H04M 15/44 |
| 11,652,895 | B1 * | 5/2023 | Sapra ................... H04L 41/5058 709/223 |
| 11,849,506 | B2 * | 12/2023 | Jayaramachar ......... H04W 8/20 |
| 2003/0129991 | A1 * | 7/2003 | Allison .................. H04W 8/12 455/456.1 |
| 2020/0322821 | A1 * | 10/2020 | Lee ..................... H04L 65/1016 |
| 2020/0396132 | A1 * | 12/2020 | Wang .................. H04L 41/0853 |
| 2021/0258861 | A1 * | 8/2021 | Wang .................... H04W 48/14 |
| 2021/0367916 | A1 * | 11/2021 | Belling ............... H04L 41/5058 |
| 2022/0015023 | A1 * | 1/2022 | De-Gregorio-Rodriguez .............. H04L 67/02 |
| 2022/0038999 | A1 * | 2/2022 | Sapra .................... H04W 60/00 |
| 2022/0224760 | A1 * | 7/2022 | Foti ..................... H04L 61/4588 |
| 2022/0240171 | A1 * | 7/2022 | Singh ................... H04W 48/18 |
| 2022/0272622 | A1 * | 8/2022 | de-Gregorio-Rodriguez .............. H04W 48/18 |
| 2022/0295386 | A1 * | 9/2022 | Lu ........................... H04L 67/51 |

\* cited by examiner

METHODS, SYSTEMS, AND COMPUTER READABLE MEDIA FOR REDUCING INTER-PUBLIC LAND MOBILE NETWORK (PLMN) FORWARDING OF MESSAGES RELATING TO Nnrf SERVICE OPERATIONS

TECHNICAL FIELD

The subject matter described herein relates to processing of messages relating to Nnrf service operations. More particularly, the subject matter described herein relates to methods, systems, and computer readable media for reducing inter-PLMN forwarding of messages relating to Nnrf service operations.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can obtain information about producer NF instances that have registered with the NRF through the NF service discovery procedure. According to the NF service discovery procedure, a consumer NF sends an NF discovery request to the NRF. The NF discovery request includes query parameters that the NRF uses to locate NF profiles of producer NFs capable of providing the service identified by the query parameters. NF profiles are data structures that define the type of service provided by a producer NF instance and well as contact and capacity information regarding the producer NF instance.

In addition to consumer NFs, another type of network node that can invoke the NF service discovery procedure to obtain information about NF service instances is a service communication proxy (SCP). The case where the SCP uses the NF service discovery procedure to obtain information about producer NF instances on behalf of consumer NFs is referred to as delegated discovery. Consumer NFs connect to the SCP, and the service SCP load balances traffic among producer NF service instances that provide the required services or directly routes the traffic to the destination producer NF instances. The communications model where consumer NFs communicate with producer NFs via the SCP is referred to as the indirect communications model.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G and other communications networks is that requests for Nnrf service operations are routed from an NRF in a network serving a subscriber (i.e., a visited or serving network) to an NRF in a home network of the subscriber, and responses to requests for service operations are routed from the NRF in the home network to the NRF in the visited network. Nnrf is the 3GPP-defined name of the interface provided by the NRF. Nnrf service operations are service provided by the NRF, and include NFDiscovery, NFStatusSubscribe, and Access-Token service operations. Requiring each request for an Nnrf service operation to travel from the NRF in the visited network to the NRF in the home network of the subscriber and each response to travel from the NRF In the home network to the NRF in the visited network increases latency for services required by mobile subscribers.

Accordingly, there exists a need for improved methods, systems and computer readable media for handling messages relating to Nnrf service operations.

SUMMARY

A method for reducing inter-public land mobile network (PLMN) forwarding of messages relating to Nnrf service operations includes, at a first network function (NF) repository function (NRF), receiving a first request for an Nnrf service operation. The method further includes determining that the first request identifies a PLMN different from a PLMN of the first NRF. The method further includes determining that the first request cannot be processed locally at the first NRF and, in response, forwarding the first request to a second NRF in the PLMN identified in the first request. The method further includes receiving, from the second NRF, a response to the first request. The method further includes caching information from the response. The method further includes receiving a second request for an Nnrf service operation. The method further includes determining that the second request identifies a PLMN different from the PLMN of the first NRF. The method further includes determining that the second request can be processed locally at the first NRF. The method further includes processing the second request locally at the first NRF using the cached information from the first response.

According to another aspect of the subject matter described herein, receiving a first request for an Nnrf service operation includes receiving a first request for an Nnrf_NF-Discovery service operation and caching information from the response includes caching NF profiles from the response.

According to another aspect of the subject matter described herein, receiving a second request for the Nnrf service operation includes receiving a second request for the Nnrf_NFDiscovery service operation and processing the second request locally at the first NRF includes responding to the second request for the Nnrf_NFDiscovery service operation using the NF profiles cached from the response to the first request for the Nnrf_NFDiscovery service operation.

According to another aspect of the subject matter described herein, the method for reducing inter-PLMN forwarding of messages relating to Nnrf service operations includes reading, by the first NRF and from the response to the first request for the Nnrf_NFDiscovery service operation, a validity period, detecting expiration of the validity period, and in response to detecting expiration of the validity period, sending, to the second NRF, a third request for the Nnrf_NFDiscovery service operation, receiving a response to the third request for the Nnrf_NFDiscovery service operation, and updating NF profiles cached by the first NRF based on the response.

According to another aspect of the subject matter described herein, the method for reducing inter-PLMN forwarding of messages relating to Nnrf service operations includes transmitting, by the first NRF, a request for an NFStatusSubscribe service operation requesting to be notified of changes in status of the NF profiles obtained from the response to the first request for the Nnrf_NFDiscovery service operation, receiving a response to the request for the NFStatusSubscribe service operation including updated information for the NF profiles, and caching the updated information for the NF profiles locally at the first NRF.

According to another aspect of the subject matter described herein, receiving a first request for an Nnrf service operation includes receiving a first request for an Nnrf_AccessToken service operation and caching information from the response includes caching an access token from the response.

According to another aspect of the subject matter described herein, receiving a second request for an Nnrf service operation includes receiving a second request for an Nnrf_AccessToken service operation and processing the second request locally at the first NRF includes responding to the second request for the Nnrf_AccessToken service operation using the access token cached from the response to the first request for the Nnrf_AccessToken service operation.

According to another aspect of the subject matter described herein, receiving a first request for an Nnrf service operation includes receiving a first request for an NFStatusSubscribe service operation and caching information from the response includes caching an NF profile from the response.

According to another aspect of the subject matter described herein, receiving a second request for the Nnrf service operation includes receiving a second request for the NFStatusSubscribe service operation and processing the second request locally at the first NRF includes responding to the second request for the NFStatusSubscribe service operation using the NF profile cached from the response to the first request for the NFStatusSubscribe service operation.

According to another aspect of the subject matter described herein, processing the second request locally at the first NRF using the cached information from the first response includes processing the second request at the visited NRF without forwarding the second request to the second NRF.

According to another aspect of the subject matter described herein, a system for reducing inter-public land mobile network (PLMN) forwarding of messages relating to Nnrf service operations is provided. The system includes a first network function (NF) repository function (NRF) including at least one processor and a memory. The system further includes an Nnrf service operation message handler implemented by the at least one processor for receiving a first request for an Nnrf service operation, determining that the first request identifies a PLMN different from a PLMN of the first NRF, determining that the first request cannot be processed locally at the first NRF and, in response, forwarding the first request to a second NRF in the PLMN identified in the first request, receiving, from the second NRF, a response to the first request, caching information from the response, receiving a second request for an Nnrf service operation, determining that the second request identifies a PLMN different from the PLMN of the first NRF, determining that the second request can be processed locally at the first NRF, and processing the second request locally at the first NRF using the cached information from the first response.

According to another aspect of the subject matter described herein, the first request for an Nnrf service operation includes a first request for an Nnrf_NFDiscovery service operation and the information cached from the response includes NF profiles from the response.

According to another aspect of the subject matter described herein, the second request for an Nnrf service operation includes a second request for the Nnrf_NFDiscovery service operation and the Nnrf service operation message handler is configured to process the second request locally at the first NRF by responding to the second request for the Nnrf_NFDiscovery service operation using the NF profiles cached from the response to the first request for the Nnrf_NFDiscovery service operation.

According to another aspect of the subject matter described herein, the Nnrf service operation message handler is configured to read, from the response to the first request for the Nnrf_NFDiscovery service operation, a validity period, detect expiration of the validity period, and in response to detecting expiration of the validity period, send, to the second NRF, a third request for the Nnrf_NFDiscovery service operation, receive a response to the third request for the Nnrf_NFDiscovery service operation, and update NF profiles cached by the first NRF based on the response.

According to another aspect of the subject matter described herein, the Nnrf service operation message handler is configured to transmit, to the second NRF, a request for an NFStatusSubscribe service operation requesting to be notified of changes in status of the NF profiles obtained from the response to the first request for the Nnrf_NFDiscovery service operation, receive a response to the request for the NFStatusSubscribe service operation including updated information for the NF profiles, and cache the updated information for the NF profiles locally at the first NRF.

According to another aspect of the subject matter described herein, the first request for an Nnrf service operation includes a first request for an Nnrf_AccessToken service operation and the Nnrf service operation message handler is configured to cache an access token from the response.

According to another aspect of the subject matter described herein, the second request for an Nnrf service operation includes a second request for the Nnrf_AccessToken service operation, the Nnrf service operation message handler is configured to respond to the second request for the Nnrf_AccessToken service operation using the access token cached from the response to the first request for the Nnrf_AccessToken service operation.

According to another aspect of the subject matter described herein, the first request for an Nnrf service operation includes a first request for an NFStatusSubscribe service operation and the Nnrf service operation message handler is configured to cache an NF profile from the response.

According to another aspect of the subject matter described herein, the second request for the Nnrf service operation includes a second request for the NFStatusSubscribe service operation, and the Nnrf service operation message handler is configured to process the second request locally at the first NRF by responding to the second request for the NFStatusSubscribe service operation using the NF profile cached from the response to the first request for the NFStatusSubscribe service operation.

According to another aspect of the subject matter described herein, a non-transitory computer readable medium having stored thereon executable instructions that when executed by a processor of a computer control the computer to perform steps is provided. The steps are performed at a first network function (NF) repository function (NRF). The steps include receiving a first request for an Nnrf service operation. The steps further include determining that the first request identifies a public land mobile network (PLMN) different from a PLMN of the first NRF. The steps further include
  determining that the first request cannot be processed locally at the first NRF and, in response, forwarding the first request to a second NRF in the PLMN identified in the first request. The steps further include receiving, from the second NRF, a response to the first request. The steps further include caching information from the response. The steps further include receiving a second request for an Nnrf service operation. The steps further include determining that the second request identifies a PLMN different from the PLMN of the first NRF. The steps further include determining that the second request can be processed locally at the first NRF. The steps further include processing the second request locally at the first NRF using the cached information from the first response.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
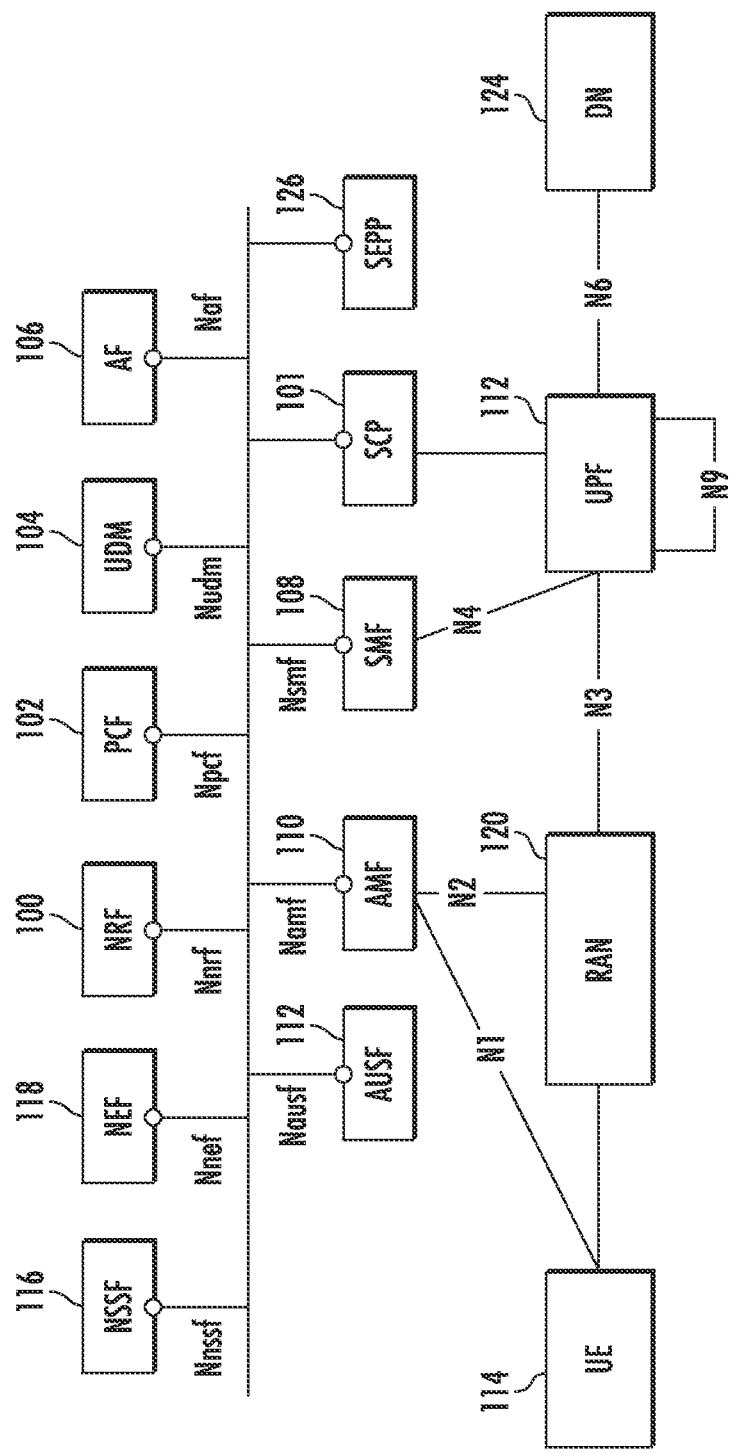
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs. NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services.

In the illustrated example, the NFs include a policy control function (PCF) 102 that performs policy related operations in a network, a unified data management (UDM) function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, one problem that can occur in 5G and other networks is that requests for Nnrf service operations are routed from the NRF in the visited network to the NRF in the home network for processing, and responses to the requests are routed from the NRF in the home network to the NRF in the visited network, resulting in latency in performing Nnrf service operations. 3GPP TS 29.510 defines an inter-PLMN routing mechanism for 5G when a subscriber is roaming in a non-home network, which becomes a visited network or serving network with respect to the subscriber. In order to serve subscribers, consumer NFs send requests for 3GPP-defined Nnrf service operations towards the visited NRF, and the visited NRF forwards the requests to the home NRF through the visited SEPP and the home SEPP. In the current mechanism, the visited NRF sends every inter-PLMN Nnrf service request coming from multiple consumer NFs serving multiple roaming subscribers towards the home NRF, which leads to consumption of a significant amount of network bandwidth and resources, causing a multifold increase in service latency. As used herein, the phrase "inter-PLMN request" refers to a request for a service operation that identifies a PLMN that is different from the PLMN of the NRF that receives the request.

The subject matter described herein includes a mechanism in which, rather than forwarding every inter-PLMN Nnrf service request towards the home NRF, the visited NRF forwards only required/selected Nnrf service request towards the home NRF, which significantly increases throughput and reduces service latency.

Figure 2:
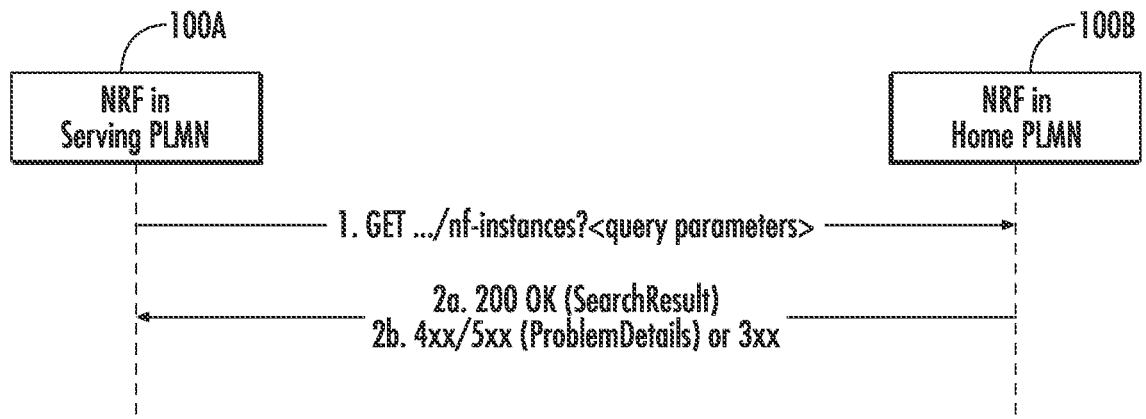
FIG. 2 is a message flow diagram illustrating exemplary messages exchanged in an NFDiscovery service operation involving NRFs located in different PLMNs.

In order to serve subscribers in a network in which a subscriber is roaming, consumer network functions send requests for 3GPP-defined Nnrf service operations towards a visited/serving NRF, and the visited/serving NRF forwards the requests to the home NRF through the visited SEPP and the home SEPP. 3GPP TS 29.510 Section 5.3.2.2.3 defines how a request for the NFDiscovery service operation is routed from an NRF in a serving PLMN towards the home PLMN. FIG. 2 illustrates exemplary messages exchanged in sending a request for an NFDiscovery service operation to the NRF in the home PLMN. Referring to FIG. 2, in line 1, visited NRF 100A sends an NFDiscovery request to home NRF 100B in the home PLMN of a subscriber. Home NRF 100B responds in line 2a with a 200 OK message containing the NF profiles matching the query parameters in the NFDiscovery request if the processing of the request is successful. If the processing of the request is not successful or the request is redirected, NRF 100B responds as indicated in line 2b with a 4xx or 5xx message including problem details or a 3xx message indicating redirection.

Similar to the NFDiscovery service operations, other service operations regarding roaming subscribers are covered in the following sections of 3GPP TS 29.510:

5.2.2.5.3 Subscription to NF Instances in a different PLMN.

5.2.2.7.3 Subscription removal in a different PLMN.

5.2.2.6.3 Notification from an NRF in a different PLMN

It should be noted that for these service operations, the NRF in visited/serving PLMN remains in the path between the consumer NF and the home PLMN.

Figure 3:
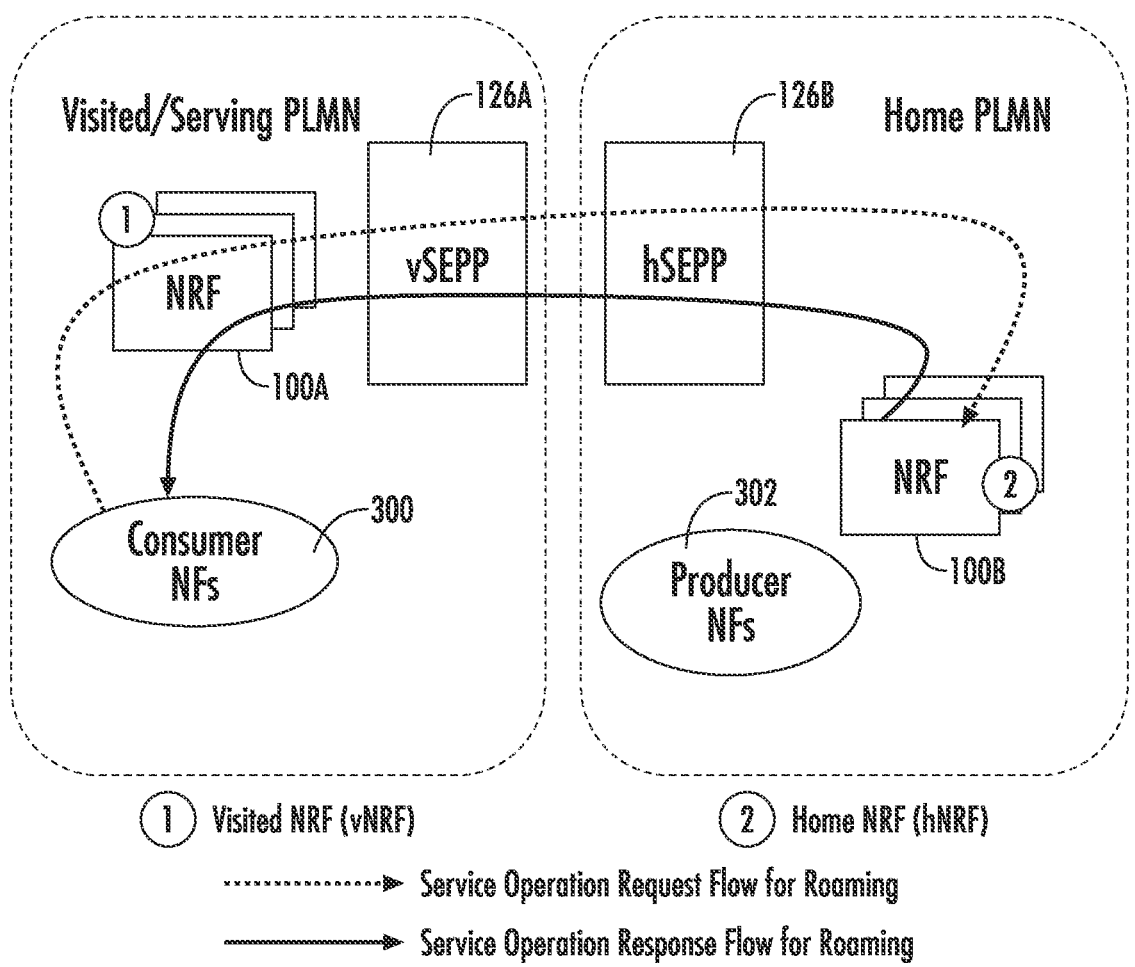
FIG. 3 is a network diagram illustrating a visited PLMN, a home PLMN, and messaging between the visited and home PLMN for an Nnrf service operation.

FIG. 3 is a network diagram illustrating inter-PLMN routing of messages relating to an inter-PLMN Nnrf NFDiscovery service operation. Referring to FIG. 3, a visited or serving PLMN is assumed to be the network serving a mobile subscriber. The visited PLMN includes a visited NRF (vNRF) 100A, a visited SEPP (vSEPP) 126A, and one or more consumer NFs 300. The home PLMN includes a home SEPP (hSEPP) 126B, home NRF (hNRF) 100B, and one or more producer NFs 302. The steps for providing inter-PLMN Nnrf_NFDiscovery service illustrated in FIG. 3 are as follows:

1. One of consumer NFs 200 sends to visited NRF 100A an Nnrf_NFDiscovery request to discover NF profiles of producer NFs 302 so that producer NFs 302 can serve subscribers in the visited/serving PLMN.
2. vNRF 100A forwards the request for Nnrf_NFDiscovery service towards hNRF 100B, which is in the home PLMN. The request for Nnrf_NFDiscovery service is routed through vSEPP 126A and hSEPP 126B.
3. hNRF 100B processes the request for Nnrf_NFDiscovery service and responds to vNRF 100B with producer NF profiles. The response is routed through hSEPP 126B and vSEPP 126A.
4. vNRF 100A sends producer NF profiles towards consumer NFs 300.

As illustrated by the example in FIG. 3, visited/serving NRF 100A forwards every inter-PLMN Nnrf service request towards the home NRF 100B through visited SEPP 126A and home SEPP 126B. Other types of Nnrf service requests, such as requests for NFStatusSubscribe and AccessToken service, require visited/serving NRF 100A to forward the service requests towards the home NRF 100B. The forwarding of service requests to the home network consumes a significant amount of network bandwidth and resources. High latency can be observed because of various network nodes, including the WAN network, while processing the inter-PLMN routing messages. The inter-PLMN forwarding of Nnrf service requests and responses can adversely impact the service experience of a 5G subscriber.

In order to address these issues, the subject matter described herein includes using the visited NRF to identify requests for Nnrf service operations that can be processed locally at the visited NRF and processing the identified requests at the visited NRF without forwarding the requests to the home NRF. The subject matter described herein also includes caching data from the home NRF at the visited NRF and using the data to process requests for inter-PLMN Nnrf service operations, such as the Nnrf NFDiscovery, AcessToken, and StatusSubscribe service operations. For example, during inter-PLMN NFDiscovery service operation handling, the visited/serving NRF receives NF profiles from the home NRF. The visited/serving NRF stores the resulting NF profiles into a database local to the visited NRF. When the same consumer NF or other consumer NFs of the same or different NF type as the original requestor of the NFDiscovery service operation requests an Nnrf service operation, NF profiles which are saved locally at the visited NRF are first checked to see whether they can be used to respond to the request. In the case where the visited/serving NRF can process the service request locally, the visited/serving NRF sends a response including the NF profiles to the consumer NF. If the visited/serving NRF cannot process the request locally, the visited/serving NRF can fall back to the existing home NRF communication based mechanism. The visited/serving NRF can perform similar operations to process requests for inter-PLMN AccessToken and NFStatusSubscribe service operations. Once the visited/serving NRF has built up its local data store, it can use the 3GPP-defined NFStatusSubscribe to subscribe to receive notification of updates regarding NF profiles saved in its local database to keep them updated with respect to the home NRF. The visited/serving NRF may also proactively refresh its local database using the 3GPP-defined NFDiscovery service operation when the last searched NFDiscovery validity time has elapsed.

Figure 4:
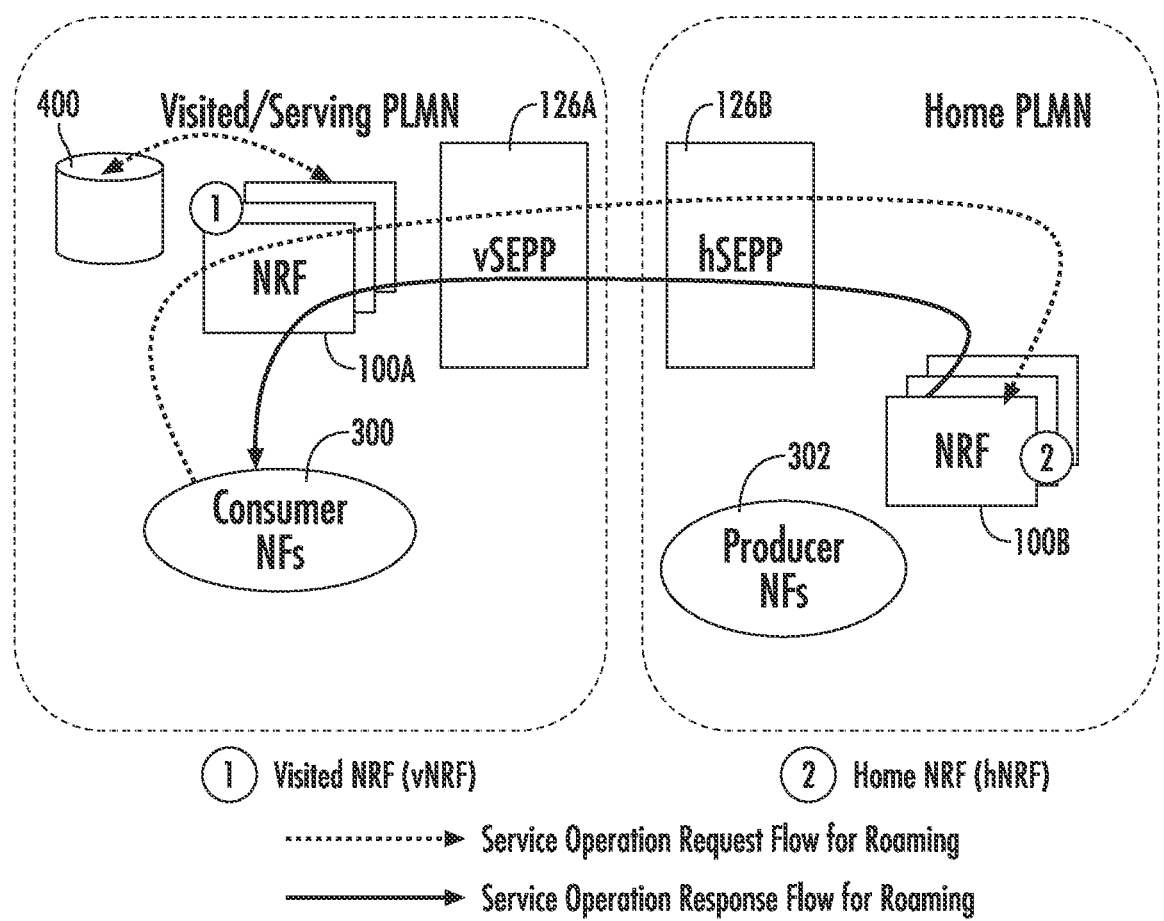
FIG. 4 is a network diagram illustrating a visited PLMN, a home PLMN, and the construction of an inter-PLMN Nnrf service operation message processing database at a visited NRF.

FIG. 4 is a network diagram illustrating exemplary operations performed by vNRF 100A in processing an initial request for an Nnrf service operation and building a database local to the vNRF 100A to process subsequent requests for Nnrf service operations. Referring to FIG. 4, the following operations are performed:

1. One of consumer NFs 300 generates a request for an inter-PLMN NFDiscovery service operation and sends the request to vNRF 100A.
2. vNRF 100A determines that it cannot process the request locally because it does not have the requested NF profile information. Accordingly, vNRF 100A forwards the request towards hNRF 100B, which is in the home PLMN.
3. hNRF 100B processes the service request and sends producer NF profiles in a response towards vNRF 100A.
4. vNRF 100A saves the returned NF profiles in an inter-PLMN Nnrf service operation message processing database 400 local to vNRF 100A.
5. vNRF 100A sends producer NF profiles towards consumer NFs 300.

Figure 5:
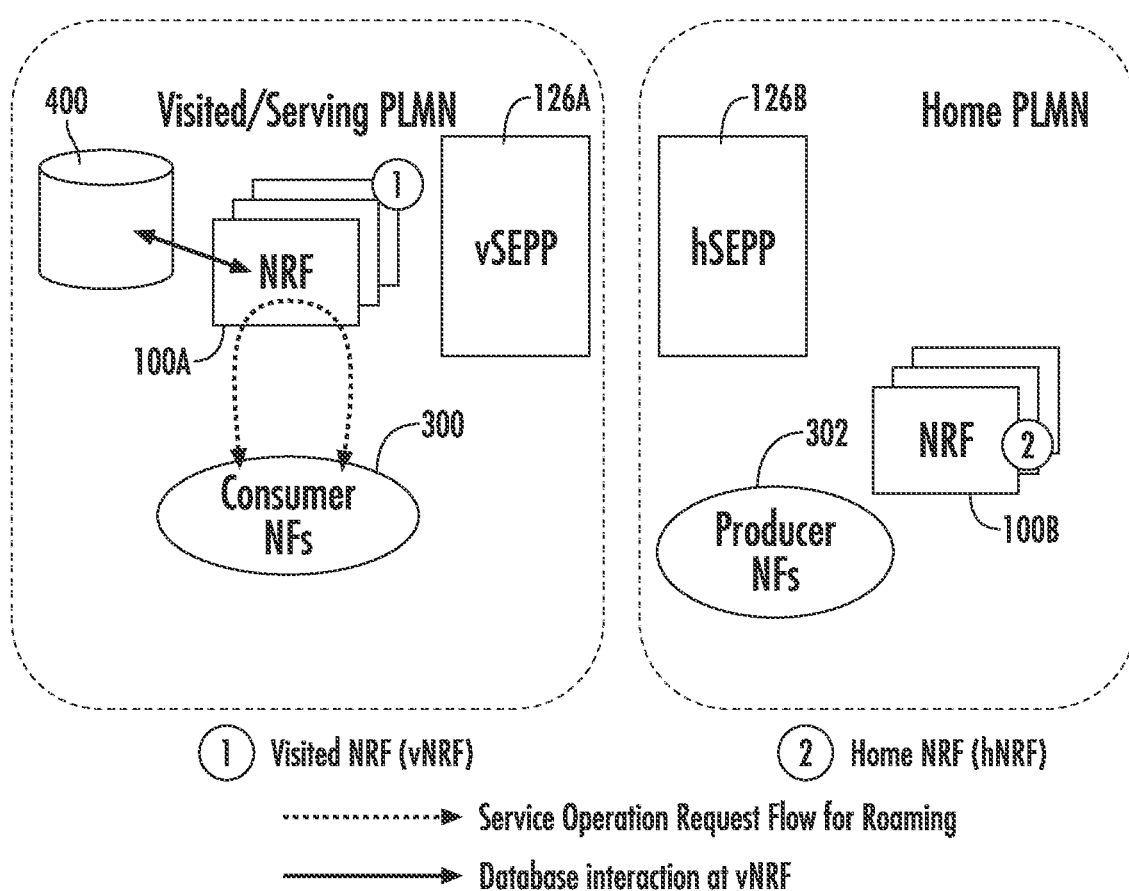
FIG. 5 is a network diagram illustrating a visited PLMN, a home PLMN, and the use of the inter-PLMN Nnrf service operation message processing database to process messages relating to Nnrf service operations in the visited PLMN.

FIG. 5 is a network diagram illustrating processing of a request for an inter-PLMN Nnrf_NFDiscovery service operation using data cached locally at Nnrf 100A. Referring to FIG. 5, the following operations are performed:

1. One of consumer NFs 300 generates and sends a request for an NFDiscovery service operation and sends the request to vNRF 100A.
2. vNRF 100A checks inter-PLMN Nnrf service operation message processing database 400 and determines that it has the NF profiles requested by the request for the NFDiscovery service operation.
3. vNRF 100A generates and sends a response to the request for the NFDiscovery service operation to the requesting consumer NF and includes the NF profiles extracted from inter-PLMN Nnrf service operation message processing database 400 local to vNRF 100A in the NF discovery response.

Figure 6:
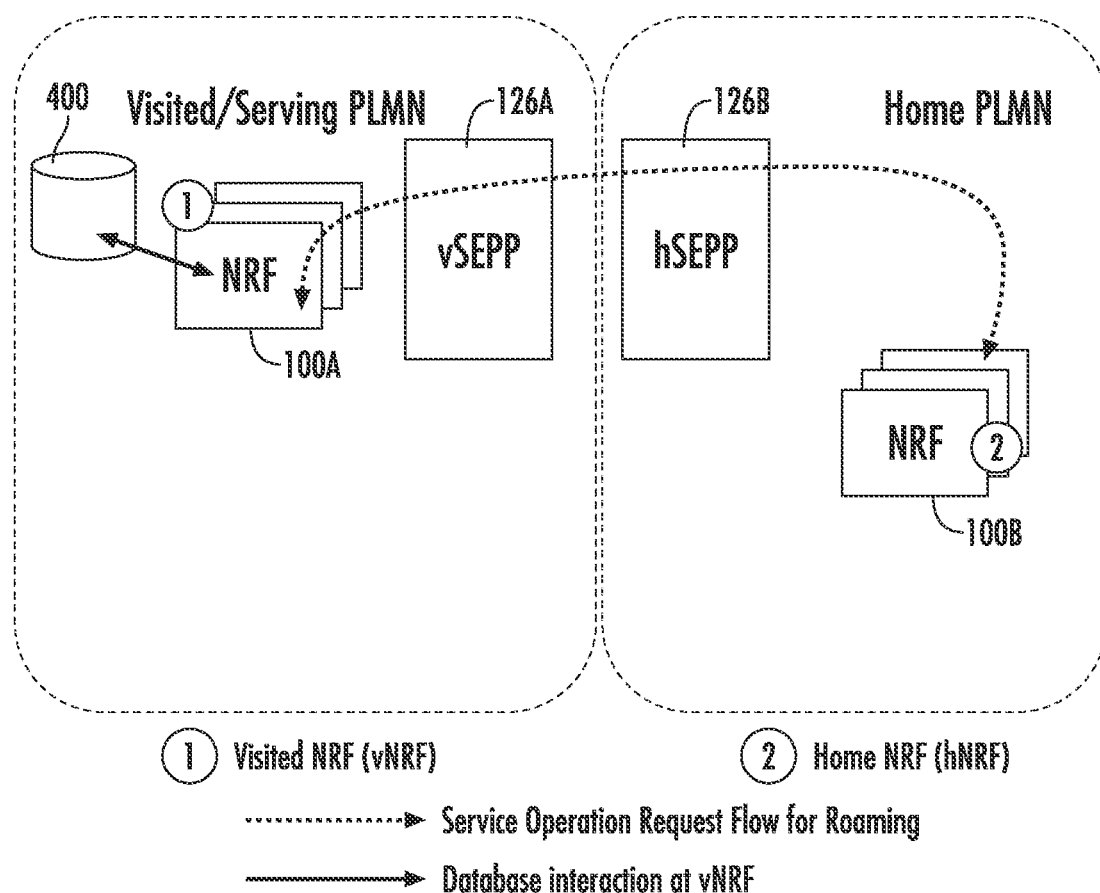
FIG. 6 is a network diagram illustrating a visited PLMN, a home PLMN, and the synchronizing of the inter-PLMN Nnrf service operation message processing database with the NF profiles database at the NRF in the home PLMN.

In addition to building inter-PLMN Nnrf service operation message processing database 400 from responses to requests for Nnrf service operations and using the local data to respond to requests for Nnrf service operations, vNRF 100A may also perform operations to keep inter-PLMN Nnrf service operation message processing database 400 synchronized with changes in NF profiles at hNRF 100B. FIG. 6 is a network diagram illustrating exemplary operations performed by vNRF 100A in keeping inter-PLMN Nnrf service operation message processing database 400 synchronized with changes in NF profiles maintained by hNRF 100B. In FIG. 6, vNRF 100A performs the following operations:

1. Once vNRF 100A has added NF profiles to inter-PLMN Nnrf service operation message processing database 400, vNRF 100A can use 3GPP-defined NFStatusSubscribe service operation to subscribe with hNRF 100B for NF profiles saved in inter-PLMN Nnrf service operation message processing database 400 to keep them updated with respect to hNRF 100B.
2. vNRF 100A may also proactively refresh inter-PLMN Nnrf service operation message processing database 400 using the 3GPP-defined NFDiscovery service operation when the last searched NF discovery validity time is elapsed.

Figure 7:
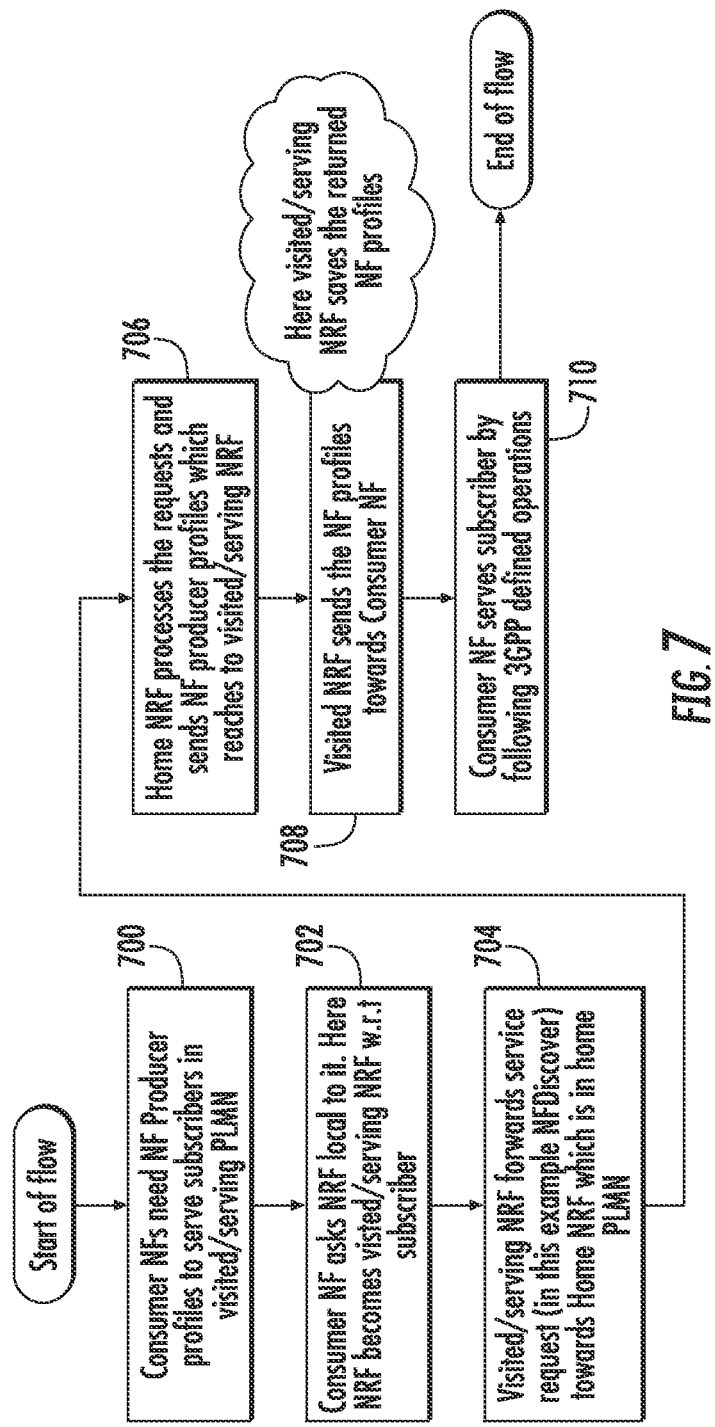
FIG. 7 is a flow chart illustrating an exemplary process for handling an initial message relating to an Nnrf service operation at an NRF located in a visited or serving network.

FIG. 7 is a flow chart illustrating an exemplary process for generating a local database at a visited NRF for processing inter-PLMN Nnrf service requests. Referring to FIG. 7, in step 700, a consumer NF determines that it needs NF profiles to serve a subscriber in a visited or serving PLMN. For example, an AMF in a serving or visited PLMN may determine that it needs NF profiles of UDMs in the subscriber's home network to provide communications service to the subscriber.

In step 702, the consumer NF generates and sends a request for an NFDiscovery service operation to the NRF local to the consumer NF.

In step 704, the serving NRF determines that the request is a request concerning a roaming subscriber and that the serving NRF does not have the NF profiles corresponding to the query parameters in the request for the NFDiscovery service operation. Accordingly, the serving NRF forwards the request for the NFDiscovery service operation to the home NRF.

In step 706, the home NRF processes the request for the NF discovery service operation, extracts the NF profiles from its NF profiles database, and generates and sends a response including the NF profiles to the visited or serving NRF.

In step 708, the visited or serving NRF sends the NF profiles to the requesting consumer NF. The visited NRF also stores the returned NF profiles in its local NF profiles database.

In step 710, the consumer NF serves the mobile subscriber according to 3GPP-defined operations. Continuing with the AMF example, the AMF serving the subscriber may select a UDM from the UDM profiles received from the visited NRF, contact the UDM to obtain subscription information regarding a roaming mobile subscriber, and use the subscription information to provide communications services to the mobile subscriber.

Figure 8:
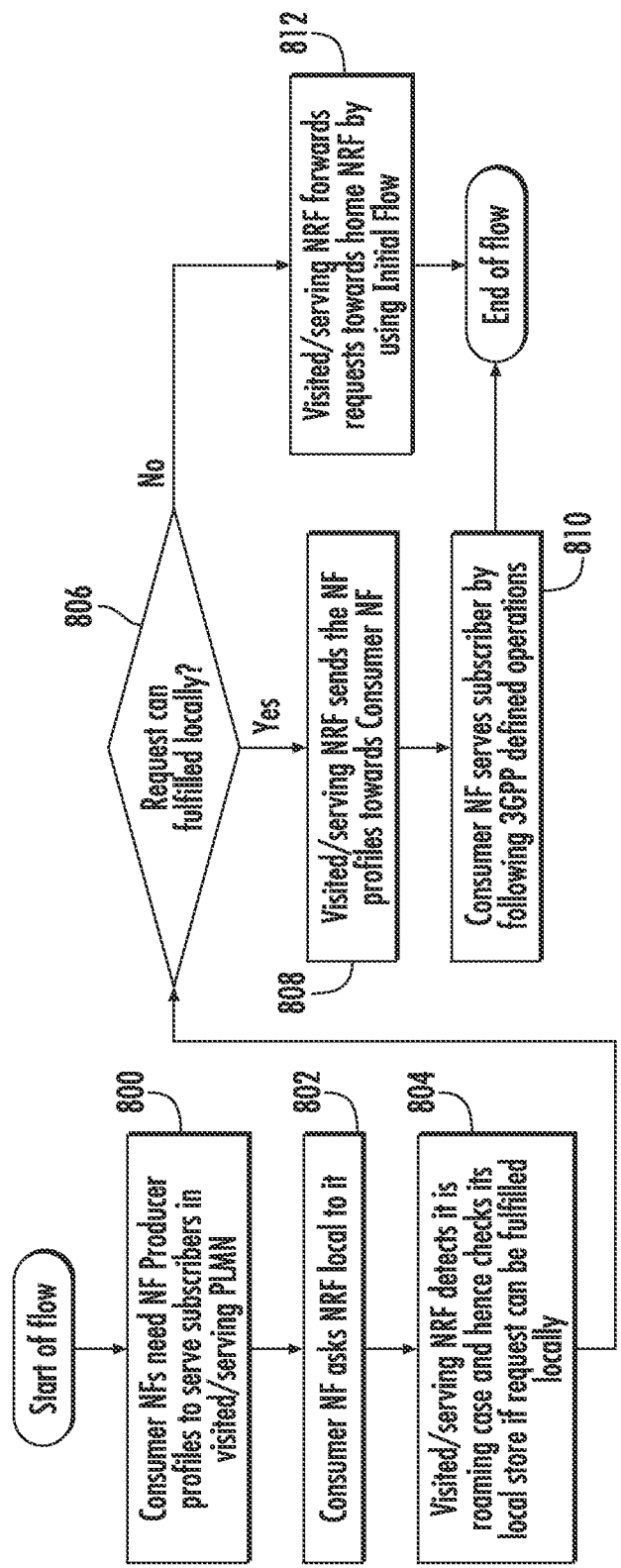
FIG. 8 is a flow chart illustrating an exemplary process for handling a message relating to an Nnrf service operation at an NRF located in a visited or serving network where the message is processed locally using the inter-PLMN Nnrf service operation message processing database at the visited NRF.

FIG. 8 is a flow chart illustrating an exemplary process for using a local database at a visited NRF to process inter-PLMN Nnrf service requests. Referring to FIG. 8, in step 800, a consumer NF determines that it needs NF profiles to serve a subscriber in a visited or serving PLMN. For example, an AMF in a serving or visited PLMN may determine that it needs NF profiles of UDMs in the subscriber's home network to provide communications service to the subscriber.

In step 802, the consumer NF generates and sends a request for an NFDiscovery service operation to the NRF local to the consumer NF. The request includes query parameters, such as NF type, that the NRF can use to identify NF profiles of producer NFs to provide in response to the service request.

In step 804, the serving NRF determines that the request is a request concerning a roaming subscriber. For example, the serving NRF may read the PLMN specified in the request and determine that the PLMN does not match the PLMN of the serving NRF.

In step 806, the serving NRF checks whether the serving NRF has the NF profiles corresponding to the query parameters in the request for the NFDiscovery service operation. If the serving NRF does not have the NF profiles, control proceeds to step 808 where the serving NRF sends the NFDiscovery request to the home NRF. If the serving NRF has the NF profiles to satisfy the NFDiscovery request, control proceeds to step 810 where the serving NRF obtains the NF profiles from its local database and generates and sends a response to the NFDiscovery request, including the NF profiles, to the consumer NF. In step 812, the consumer NF uses the NF profiles to initiate 3GPP service operations.

Figures 9A, 9B:
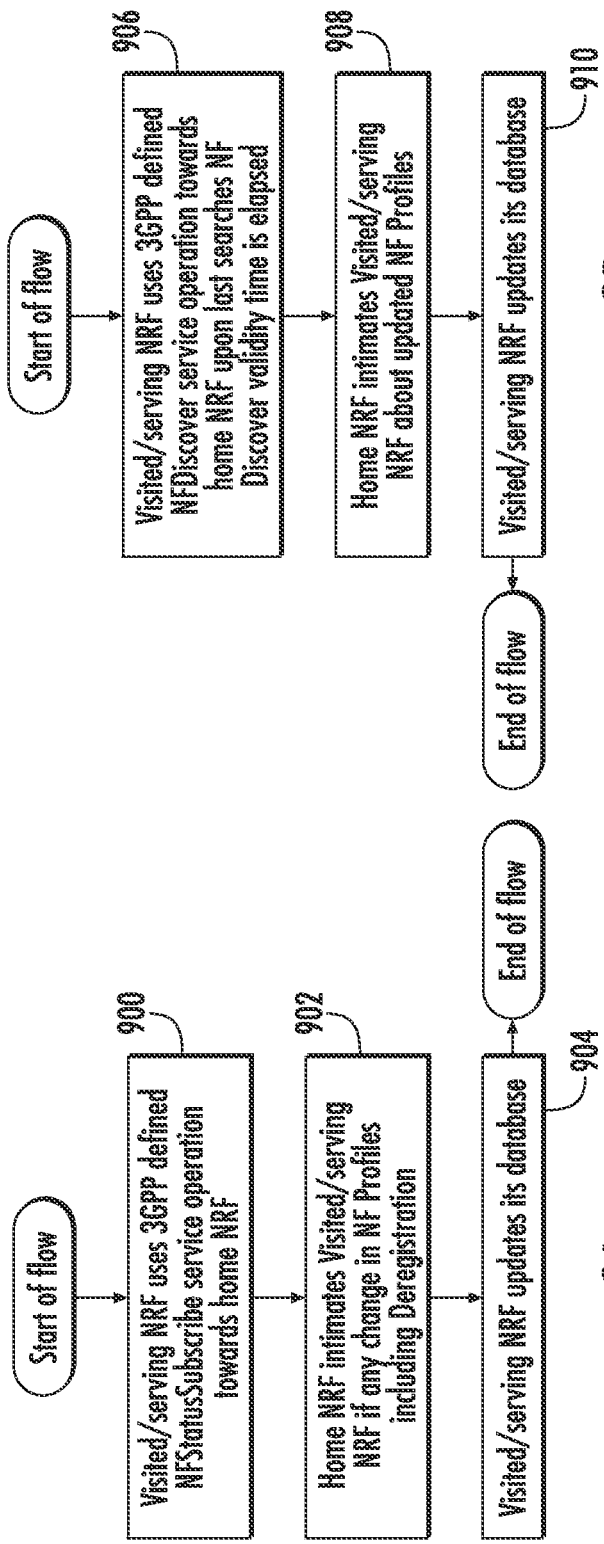
FIGS. 9A and 9B are a flow chart illustrating an exemplary process for synchronizing the inter-PLMN Nnrf service operation message processing database with the NF profiles database in the home PLMN.
Figure 10:
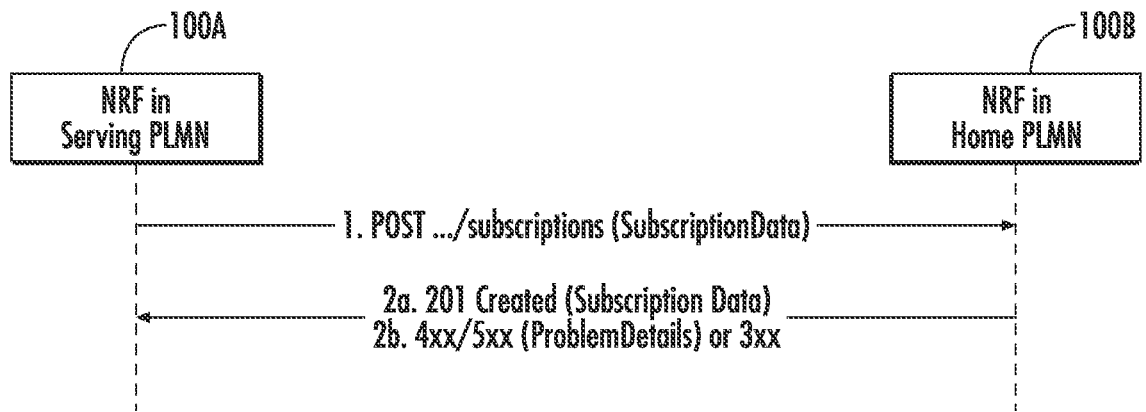
FIG. 10 is a message flow diagram illustrating exemplary messages exchanged in an NFStatusSubscribe service operation.

Once the local database is created at the serving or visited NRF, the serving or visited NRF may perform active operations to maintain the database, i.e., make sure that the database is synchronized with the NF profiles or other database maintained by the home NRF. FIGS. 9A and 9B are a flow chart illustrating an exemplary process for synchronizing the local database at the visited NRF with the database at the home NRF. Referring to FIG. 9A, in step 900, the visited NRF uses the 3GPP-defined NFStatusSubscribe service operation to subscribe to receive notification of changes in NF profiles maintained by the home NRF. FIG. 10 is a message flow diagram illustrating exemplary messages exchanged in the NFStatusSubscribe service operation. Referring to FIG. 10, in line 1, visited NRF 100A sends an HTTP POST message to NRF 100B located in the home PLMN. The HTTP POST message includes subscription data, which in this example, includes the NF instance IDs of the NF instances whose NF profiles are stored in the local database maintained by visited NRF 100A. In line 2a, NRF 100B located in the home PLMN responds with a 201 Created message indicating that the subscription was successfully created and includes subscription data, which will include any updates to the NF profiles identified by the subscription data in the subscription request. If creation of the subscription is not successful or if the request for creating the subscription is redirected, NRF 100B located in the home PLMN responds as indicated in line 2b with a 4xx or 5xx message with problem details or a 3xx message in the redirection case.

Returning to FIG. 9A, in step 902, the home NRF informs the visited NRF of any changes in the NF profiles identified in the subscription request. Such changes can include deregistration or any change to the NF profile database. Home NRF 100B may inform visited NRF 100A of changes in the NF profiles by transmitting an NFStatusNotify message to visited NRF 100A.

In step 904, visited NRF 100A updates inter-PLMN Nnrf service operation message processing database 400 using the information obtained from home NRF 100B. Such changes may include deregistration of NF profiles or change in NF profile parameter values of the NF profiles in inter-PLMN Nnrf service operation message processing database 400 maintained by visited NRF 100A. Visited NRF 100A may used the updated NF profile parameters to respond locally to NFDiscovery and other requests for inter-PLMN Nnrf service.

In addition to using the NFStatusSubscribe service operation to maintain synchronization between inter-PLMN Nnrf service operation message processing database 400 and the database maintained by home NRF 100B, visited NRF 100A may also use the validity timer specified for the NFDiscovery service operation to obtain updated NF profile data from the home NRF. According to Section 6.2.2.2.3 of 3GPP TS 29.510, a response to a request for an NFDiscovery service operation includes a cache control header which includes a max-age value, which is an amount of time in seconds after which the received response is considered stale. Visited NRF 100A may use this value to determine when to update inter-PLMN Nnrf service operation message processing database 400. Referring to FIG. 9B, in step 906, visited NRF 100A detects expiration of a validity period for an NFDiscovery service operation and transmits and NFDiscovery request to the home NRF. Detecting expiration of the validity period may include determining that a response received from home NRF 100B is stale because the current time is past the validity period. The NFDiscovery request may include the same query parameters as the NFDiscovery request for which the validity timer expired.

In step 908, the home NRF responds to the visited NRF with updated NF profile information. For example, home NRF 100B may respond to the NRF discovery request with NF profiles matching query parameters in the NF discovery request.

In step 910, visited NRF 100A updates inter-PLMN Nnrf service operation message processing database 400 with the updated NF profile information received from home NRF 100A. Visited NRF may use the updated NF profile information to respond to inter-PLMN requests for Nnrf service.

As indicated above, in addition to using its local database to respond to inter-PLMN NFDiscovery requests, visited NRF 100A may also use its local database to respond to a request for an inter-PLMN NFStatusSubscribe service operation and an AccessToken service operation. In using inter-PLMN Nnrf service operation message processing database 400 to respond to a request for an inter-PLMN NFStatusSubscribe service operation, visited NRF 100A may perform the steps illustrated in FIGS. 8, 9A, and 9B, which include determining if the request for the inter-PLMN NFStatusSubscribe service operation can be handled locally by visited NRF 100A. If the request can be handled locally by visited NRF 100A, visited NRF 100A creates the subscription to the requested resource in its local database and subscribes with home NRF 100B to be notified of changes in the requested resource. The messaging exchanged between visited NRF 100A and home NRF 100B is the same as that described above with respect to FIG. 10. When visited NRF 100A is informed of a change in a resource corresponding to a subscription, visited NRF 100A will inform the consumer NFs subscribed to be notified of the changes.

Figure 11:
FIG. 11 is a message flow diagram illustrating exemplary messages exchanged in an AccessToken service operation.

In processing requests for inter-PLMN Nnrf_AccessToken service using inter-PLMN Nnrf service operation message processing database 400, visited NRF 100A may perform the steps described above with regarding FIGS. 8, 9A, and 9B, except the local database and the responses will include OAuth2 access tokens instead of NF profiles. Processing requests for Nnrf_AccessToken service includes determining if a request for an inter-PLMN Nnrf_AccessToken service operation can be handled locally by visited NRF 100A. If the request can be handled locally by visited NRF 100A, visited NRF 100A responds with an access token response, which includes the OAuth2 access token requested by the consumer NF. The messaging exchanged between visited NRF 100A and a consumer NF 300 for the case where visited NRF 100A has the requested access token of the remote producer NF is illustrated in FIG. 11. Referring to FIG. 11, in line 1, consumer NF 300 sends an access token request to visited NRF 100A. In line 2a, after retrieving the requested access token from inter-PLMN Nnrf service operation message processing database 400, visited NRF 100A responds with a 200 OK message including the requested access token. If an error occurs or the request is redirected, visited NRF 100A responds as indicated in step 2b with a 400 Bad Request or a 3xx message indicating that the request has been redirected. If the access token request is redirected to home NRF 100B, home NRF 100B may respond to the access token request with the requested access token. Visited NRF 100A may forward the access token response to consumer NF 300. Visited NRF 100A may also store the access token in inter-PLMN Nnrf service operation message processing database 400 so that visited NRF 100A can respond to a subsequent access token request for the same access token from the same or a different consumer NF.

Figure 12:
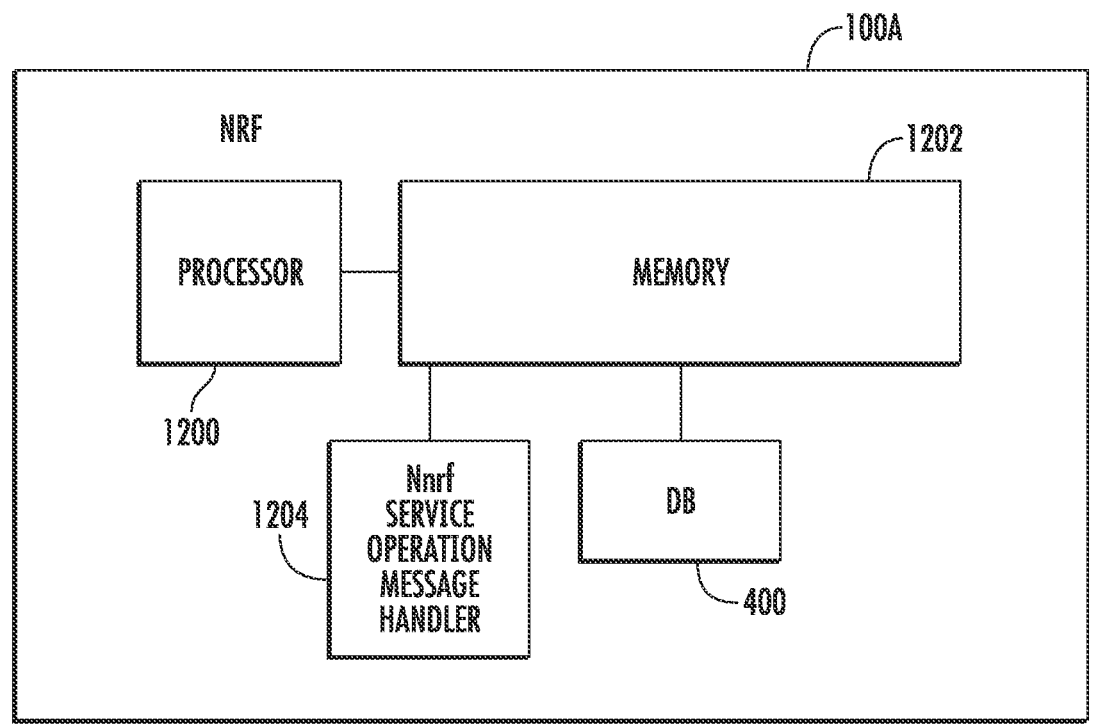
FIG. 12 is a block diagram illustrating an exemplary architecture for an NRF configured to reduce inter-PLMN forwarding of messages relating to Nnrf service operations.

FIG. 12 is a block diagram illustrating an exemplary system for reducing inter-PLMN forwarding of messages relating to Nnrf service operations. In FIG. 12, the system includes a first network function (NF) repository function (NRF) 100A including at least one processor 1200 and a memory 1202. NRF 100A further includes an inter-PLMN Nnrf service operation message handler 1204 implemented by processor 1200 for receiving a first request for an Nnrf service operation, determining that the first request identifies a PLMN different from a PLMN of the first NRF, determining that the first request cannot be processed locally at the first NRF and, in response, forwarding the first request to a second NRF in the PLMN identified in the first request, receiving, from the second NRF, a response to the first request, caching information from the response, receiving a second request for an Nnrf service operation, determining that the second request identifies a PLMN different from a PLMN of the first NRF, determining that the second request can be processed locally at the first NRF, and processing the second request locally at the first NRF using the cached information from the first response. NRF 100A further includes local inter-PLMN NF service operation message processing database 400 stored in memory 1202 and including the locally cached information (NF profile information, access tokens, etc.) for processing requests for inter-PLMN Nnrf service operations.

Figure 13:
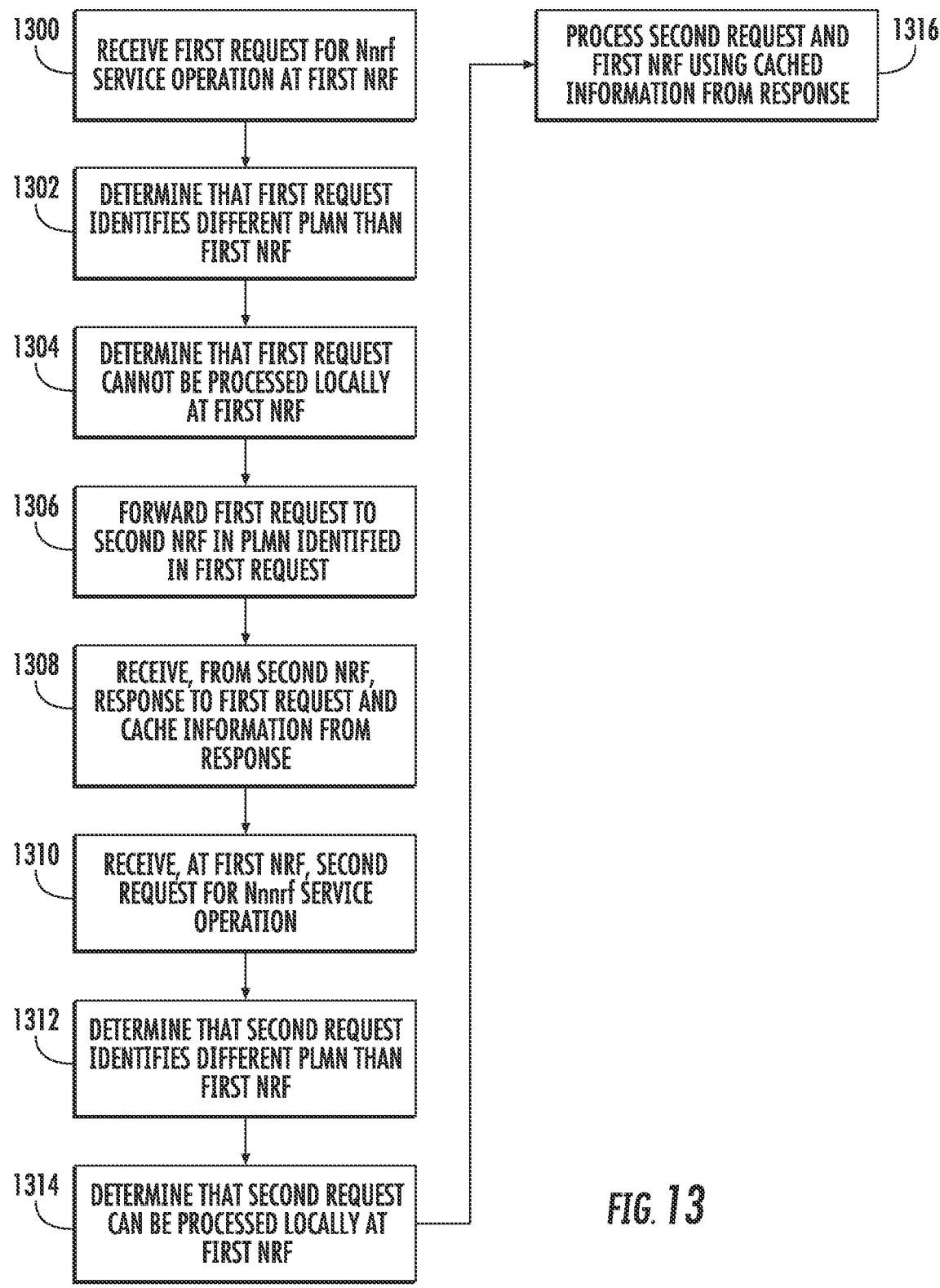
FIG. 13 is a flow chart illustrating an exemplary process for reducing inter-PLMN forwarding of messages relating to Nnrf service operations.

FIG. 13 is a flow chart illustrating an exemplary process for reducing inter-PLMN forwarding of messages relating to Nnrf service operations. Referring to FIG. 13, in step 1300, the process includes receiving, at a first NRF, a first request for an Nnrf service operation. For example, visited NRF 100A may receive a request for an Nnrf service operation, such as an NFDiscovery service operation, an NFStatusSubscribe service operation, or an Access Token service operation.

In step 1302, the process includes determining that the first request identifies a PLMN different from a PLMN of the first NRF. For example, visited NRF 100A may read the PLMN from a query parameter of the first request and determine that the PLMN is not the same as the PLMN of NRF 100A.

In step 1304, the process includes determining that the first request cannot be processed locally at the first NRF. For example, if the first request is an NFDiscovery or NFStatusSubscribe request, NRF 100A may determine that the request cannot be processed locally by NRF 100A because NRF 100A does not have NF profiles identified by query parameters in the NFDiscovery or NFStatusSubscribe request. If the first request is an AccessToken request, NRF 100A may determine that the first request cannot be processed locally by NRF 100A because NRF 100A does not have the requested access token.

In step 1306, the process includes forwarding the first request to a second NRF in the PLMN identified in the first request. For example, visited NRF 100A may, in response to determining that it cannot process the first request for an Nnrf service operation, forward the request to the PLMN identified in the first request.

In step 1308, the process includes receiving, from a second NRF, a response to the first request and caching information from the response. For example, visited NRF 100A may receive a response to the first request from home NRF 100B and store NF profile or access token information in local inter-PLMN Nnrf service operation message processing database 400.

In step 1310, the process includes receiving a second request for an Nnrf service operation. For example, visited NRF 100A may receive a request for the same or a different Nnrf service from that requested by the first request.

In step 1312, the process includes determining that the second request identifies a PLMN other than the PLMN of the first NRF. For example, visited NRF 100A may determine that the PLMN identified in the query parameters of the second request does not match the configured PLMN of visited NRF 100A.

In step 1314, the process includes determining that the second request can be processed locally at the first NRF. For example, visited NRF 100A may access local inter-PLMN Nnrf service operation message processing database 400 using query parameters from the second request, determine that database 400 includes the requested NF profile or access token information, and, as a result, determine that the second request can be processed locally by visited NRF 100A.

In step 1316, the process includes processing the second request locally at the first NRF using the cached information from the first response. For example, visited NRF 100A may generate and send a response to the second request using the information from local inter-PLMN Nnrf service operation message processing database 400 without forwarding the second request to the PLMN identified in the second request.

The disclosure of each of the following references is incorporated herein by reference in its entirety.

REFERENCES 1. 3$^{rd}$ Generation Partnership Project; Technical Specification Group Core Network and Terminals; 5G System; Network Function Repository Services; Stage 3 (Release 17) 3GPP TS 29.510 V17.3.0 (2021-09)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for reducing inter-public land mobile network (PLMN) forwarding of messages relating to Nnrf service operations, the method comprising:
at a first network function (NF) repository function (NRF):
receiving a first request for an Nnrf service operation;
determining that the first request identifies a PLMN different from a PLMN of the first NRF;
determining that the first request cannot be processed locally at the first NRF and, in response, forwarding the first request to a second NRF in the PLMN identified in the first request;
receiving, from the second NRF, a response to the first request;
caching, by the first NRF and in an inter-PLMN Nnrf service operation message processing database local to the first NRF, results of the Nnrf service operation obtained from the response;
receiving a second request for the Nnrf service operation;
determining that the second request identifies a PLMN different from the PLMN of the first NRF;
determining that the second request can be processed locally at the first NRF;
processing the second request locally at the first NRF using the cached results of the Nnrf service operation obtained from the response; and
proactively refreshing, by the first NRF, the cached results of the Nnrf service operation maintained by the first NRF in the inter-PLMN Nnrf service operation message processing database local to the first NRF by querying, by the first NRF, the second NRF for updated results of the Nnrf service operation and by transmitting, by the first NRF, a request to be automatically notified of changes in status of NF profiles obtained from the response to the first request.

2. The method of claim 1 wherein receiving a first request for an Nnrf service operation includes receiving a first request for an Nnrf_NFDiscovery service operation and caching results of the Nnrf service operation obtained from the response includes caching the NF profiles obtained from the response to the first request.

3. The method of claim 2 wherein receiving a second request for the Nnrf service operation includes receiving a second request for the Nnrf_NFDiscovery service operation and processing the second request locally at the first NRF includes responding to the second request for the Nnrf_NFDiscovery service operation using the NF profiles cached from the response to the first request for the Nnrf_NFDiscovery service operation.

4. The method of claim 3 wherein proactively refreshing results of the Nnrf service operation comprises reading, by the first NRF and from the response to the first request for the Nnrf_NFDiscovery service operation, a validity period associated with the results of the Nnrf_NFDiscovery service operation, detecting expiration of the validity period, and wherein querying the second NRF comprises querying the second NRF in response to detecting expiration of the validity period by sending, to the second NRF, a third request for the Nnrf_NFDiscovery service operation, receiving a response to the third request for the Nnrf_NFDiscovery service operation, and updating, based on the response to the third request, the NF profiles cached by the first NRF based on the response.

5. The method of claim 2 wherein transmitting, by the first NRF, the request to be automatically notified of changes in status of the NF profiles obtained from the response to the first request includes transmitting a request for an NFStatusSubscribe service operation requesting to be notified of changes in status of the NF profiles obtained from the response to the first request for the Nnrf_NFDiscovery service operation, and the method further comprises receiving a response to the request for the NFStatusSubscribe service operation including updated information for the NF profiles and caching the updated information for the NF profiles locally at the first NRF.

6. The method of claim 1 wherein receiving a first request for an Nnrf service operation includes receiving a first request for an NFStatusSubscribe service operation and caching results of the Nnrf service operation obtained from the response includes caching the NF profiles from the response.

7. The method of claim 6 wherein receiving a second request for the Nnrf service operation includes receiving a second request for the NFStatusSubscribe service operation, and processing the second request locally at the first NRF includes responding to the second request for the NFStatusSubscribe service operation using the NF profiles cached from the response to the first request for the NFStatusSubscribe service operation.

8. The method of claim 1 processing the second request locally at the first NRF using the cached results of the Nnrf service operation obtained from the response includes processing the second request at the first NRF without forwarding the second request to the second NRF.

9. A system for reducing inter-public land mobile network (PLMN) forwarding of messages relating to Nnrf service operations, the system comprising:
a first network function (NF) repository function (NRF) including at least one processor and a memory; and
an Nnrf service operation message handler implemented by the at least one processor for receiving a first request for an Nnrf service operation, determining that the first request identifies a PLMN different from a PLMN of the first NRF, determining that the first request cannot be processed locally at the first NRF and, in response, forwarding the first request to a second NRF in the PLMN identified in the first request, receiving, from the second NRF, a response to the first request, caching, in an inter-PLMN Nnrf service operation message processing database local to the first NRF, results of the Nnrf service operation from the response, receiving a second request for the Nnrf service operation, determining that the second request identifies a PLMN different from a PLMN of the first NRF, determining that the second request can be processed locally at the first NRF, processing the second request locally at the first NRF using the cached results of the Nnrf service operation obtained from the response, and proactively refreshing the cached results of the Nnrf service operation maintained by the first NRF in the inter-PLMN Nnrf service operation message processing database local to the first NRF by querying the second NRF for updated results of the Nnrf service operation and by transmitting a request to be automatically notified of changes in status of NF profiles obtained from the response to the first request.

10. The system of claim 9 wherein the first request for an Nnrf service operation includes a first request for an Nnrf_NFDiscovery service operation and the results of the Nnrf service operation obtained from the response includes the NF profiles obtained from the response to the first request.

11. The system of claim 10 wherein the second request for the Nnrf service operation includes a second request for the Nnrf_NFDiscovery service operation and the Nnrf service operation message handler is configured to process the second request locally at the first NRF by responding to the second request for the Nnrf_NFDiscovery service operation using the NF profiles cached from the response to the first request for the Nnrf_NFDiscovery service operation.

12. The system of claim 11 wherein the Nnrf service operation message handler is configured to proactively refresh the results of the Nnrf service operation by reading, from the response to the first request for the Nnrf_NFDiscovery service operation, a validity period, detecting expiration of the validity period, and perform the querying of the second NRF in response to detecting expiration of the validity period by sending to the second NRF, a third request for the Nnrf_NFDiscovery service operation, receive a response to the third request for the Nnrf_NFDiscovery service operation, and update, based on the response to the third request, the NF profiles cached by the first NRF.

13. The system of claim 10 wherein the request to be automatically notified of changes in status of NF profiles obtained from the response to the first request comprises a request for an NFStatusSubscribe service operation requesting to be notified of changes in status of the NF profiles obtained from the response to the first request for the Nnrf_NFDiscovery service operation, and the Nnrf service operation message handler is configured to receive a response to the request for the NFStatusSubscribe service operation including updated information for the NF profiles, and cache the updated information for the NF profiles locally at the first NRF.

14. The system of claim 9 wherein the first request for an Nnrf service operation includes a first request for an NFSta-tusSubscribe service operation and the Nnrf service operation message handler is configured to cache the NF profiles from the response.

15. The system of claim 14 wherein the second request for the Nnrf service operation includes a second request for the NFStatusSubscribe service operation and the Nnrf service operation message handler is configured to process the second request locally at the first NRF by responding to the second request for the NFStatusSubscribe service operation using the NF profiles cached from the response to the first request for the NFStatusSubscribe service operation.

16. A non-transitory computer readable medium having stored thereon executable instructions that when executed by a processor of a computer control the computer to perform steps comprising:

at a first network function (NF) repository function (NRF):
receiving a first request for an Nnrf service operation;
determining that the first request identifies a public land mobile network (PLMN) different from a PLMN of the first NRF;
determining that the first request cannot be processed locally at the first NRF and, in response, forwarding the first request to a second NRF in the PLMN identified in the first request;
receiving, from the second NRF, a response to the first request;
caching, by the first NRF and in an inter-PLMN Nnrf service operation message processing database local to the first NRF, results of the Nnrf service operation obtained from the response;
receiving a second request for the Nnrf service operation;
determining that the second request identifies a PLMN different from the PLMN of the first NRF;
determining that the second request can be processed locally at the first NRF;
processing the second request locally at the first NRF using the cached results of the Nnrf service operation obtained from the response; and
proactively refreshing, by the first NRF, the cached results of the Nnrf service operation maintained by the first NRF in the inter-PLMN Nnrf service operation message processing database local to the first NRF by querying, by the first NRF, the second NRF for updated results of the Nnrf service operation and by transmitting, by the first NRF, a request to be automatically notified of changes in status of NF profiles obtained from the response to the first request.

\* \* \* \* \*